United States Patent
Gaither

(10) Patent No.: US 11,189,163 B2
(45) Date of Patent: Nov. 30, 2021

(54) SYSTEMS AND METHODS FOR INFRASTRUCTURE IMPROVEMENTS

(71) Applicant: Toyota Motor Engineering & Manufacturing North America, Inc., Plano, TX (US)

(72) Inventor: Geoffrey D. Gaither, Erlanger, KY (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 709 days.

(21) Appl. No.: 15/730,601

(22) Filed: Oct. 11, 2017

(65) Prior Publication Data

US 2019/0108749 A1  Apr. 11, 2019

(51) Int. Cl.
| | |
|---|---|
| *G08G 1/01* | (2006.01) |
| *G08G 1/0967* | (2006.01) |
| *G06Q 50/26* | (2012.01) |
| *G06Q 50/30* | (2012.01) |

(Continued)

(52) U.S. Cl.
CPC ........... *G08G 1/0137* (2013.01); *G06Q 10/04* (2013.01); *G06Q 50/26* (2013.01); *G06Q 50/30* (2013.01); *G08G 1/0112* (2013.01); *G08G 1/0129* (2013.01); *G08G 1/0133* (2013.01); *G08G 1/0145* (2013.01); *G08G 1/096791* (2013.01);
(Continued)

(58) Field of Classification Search
CPC .. G08G 1/0137; G08G 1/0112; G08G 1/0116; G08G 1/0129; G08G 1/0133; G08G 1/0145; G08G 1/096791; G06Q 10/04; G06Q 50/26; G06Q 50/30; E01C 1/002; B60W 2552/35
See application file for complete search history.

(56) References Cited

U.S. PATENT DOCUMENTS 7,571,029 B2   8/2009   Dai
8,145,513 B2   3/2012   Villalobos
(Continued)

FOREIGN PATENT DOCUMENTS

WO   2014113394   7/2014

*Primary Examiner* — Matthew S Gart
*Assistant Examiner* — Stephen S Swartz
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for obtaining vehicle operating conditions at or near a section of roadway in order to determine whether existing/current roadway infrastructure at or near that section of roadway is causing a loss in operating efficiency. Vehicle operating conditions may be communicated by vehicles to roadside units via a vehicle-to-infrastructure communications system. Upon a determination that the existing/current roadway infrastructure is causing the loss in operating efficiency, one or more recommendations for improvements to the existing/current roadway infrastructure may be suggested to a municipality controlling the section of roadway. Estimates regarding the effectiveness of the improvements as well as actual measurements regarding implemented improvements may be determined in order to justify proceeding with implementing the improvements and/or generate additional improvement recommendations.

9 Claims, 7 Drawing Sheets

(51) Int. Cl.
*G06Q 10/04* (2012.01)
*E01C 1/00* (2006.01)
(52) U.S. Cl.
CPC .......... *B60W 2552/35* (2020.02); *E01C 1/002* (2013.01)

(56) References Cited

U.S. PATENT DOCUMENTS

| | | | | |
|---|---|---|---|---|
| 8,639,436 | B2* | 1/2014 | Sujan | G06Q 10/04 |
| | | | | 701/123 |
| 9,435,654 | B2 | 9/2016 | Ibrahim | |
| 9,547,989 | B2 | 1/2017 | Fairfield | |
| 9,864,957 | B2* | 1/2018 | Rennie | G06Q 50/10 |
| 10,295,363 | B1* | 5/2019 | Konrardy | G01C 21/34 |
| 2004/0107042 | A1* | 6/2004 | Seick | G08G 1/0104 |
| | | | | 701/117 |
| 2004/0138790 | A1* | 7/2004 | Kapolka | G06Q 10/08 |
| | | | | 701/29.3 |
| 2005/0065711 | A1* | 3/2005 | Dahlgren | G08G 1/01 |
| | | | | 701/117 |
| 2009/0177515 | A1* | 7/2009 | Redd | G06Q 10/06375 |
| | | | | 705/7.37 |
| 2011/0112720 | A1 | 5/2011 | Keep | |
| 2011/0224892 | A1* | 9/2011 | Speiser | G08G 1/01 |
| | | | | 701/118 |
| 2016/0133130 | A1* | 5/2016 | Grimm | H04W 4/80 |
| | | | | 340/905 |
| 2016/0133131 | A1* | 5/2016 | Grimm | G08G 1/096725 |
| | | | | 701/117 |
| 2017/0110009 | A1 | 4/2017 | Knoepfle | |
| 2017/0221069 | A1* | 8/2017 | Remboski | G07C 5/006 |
| 2017/0322041 | A1* | 11/2017 | Stephens | G05D 1/0088 |
| 2017/0337813 | A1* | 11/2017 | Taylor | G05D 1/0287 |
| 2019/0047556 | A1* | 2/2019 | Mori | G08G 1/096741 |
| 2020/0020229 | A1* | 1/2020 | Groeneweg | G08G 1/096775 |

* cited by examiner

SYSTEMS AND METHODS FOR INFRASTRUCTURE IMPROVEMENTS

TECHNICAL FIELD

The present disclosure relates generally to determining whether or not improvements or modifications to existing roadway infrastructure should be implemented. In particular, data regarding vehicle operating efficiency at or near a section of roadway may be gathered and analyzed, and recommendations regarding improvements or modifications to the section of roadway may be made based upon the vehicle operating efficiency data.

DESCRIPTION OF RELATED ART

The number of vehicles traveling roadways is increasing. In turn, the wear and tear on existing roadway infrastructure, e.g., roadway pavement, is increasing. Even without an increase in traffic, infrastructure generally needs replacing over time, or a non-optimal infrastructure configuration may warrant updates that result in infrastructure that can better accommodate traffic patterns. In some instances, the increase in vehicles is causing additional delays. For example, whereas a three-lane expressway may have been sufficient to accommodate the number of vehicles traveling on the expressway five years ago, the three-lane expressway may now require an additional lane or more to accommodate the current number of vehicles. Moreover, current roadway infrastructure may cause other operational inefficiencies, such as a decrease in vehicle fuel economy, e.g., due to the additional delays and/or stop-and-go traffic that result in more fuel being consumed.

BRIEF SUMMARY OF THE DISCLOSURE

In accordance with one embodiment, a computer-implemented method comprises determining current operating conditions associated with a plurality of vehicles traversing a section of roadway. A current infrastructure condition of the section of roadway may also be determined. Upon detecting a change in the plurality of vehicles' current operating conditions, lost operating efficiency regarding the plurality of vehicles is calculated. Operating efficiency may reflect at least one of fuel economy and travel time. A cost-benefit analysis based upon the lost operating efficiency and potential improvements to the current infrastructure condition of the section of roadway may also be performed. Upon a determination that the cost-benefit analysis warrants implementing the one or more potential improvements, an effectiveness of the one or more potential improvements in reducing an impact of the lost operating efficiency is estimated. One or more notifications recommending the implementation of the one or more potential improvements may then be generated.

In some embodiments, current infrastructure conditions comprises at least one of a current roadway configuration, and a current roadway traffic management configuration.

Determining the current operating conditions comprises at least one of receiving sensor data indicative of, and calculating based on the sensor data, at least one of a current speed, instantaneous acceleration, and current location associated with each of the plurality of vehicles.

In some embodiments, detecting the change in the plurality of vehicles' current operating conditions comprises determining whether one or more of the plurality of vehicles experienced a slow-down while traversing the section of roadway. Determining whether the one or more of plurality of vehicles experienced a slow-down comprises detecting at least one of a slow-down from the current speed, a decrease in the instantaneous acceleration followed by an increase in the instantaneous acceleration.

In some embodiments, the method comprises correlating the current location associated with each of the plurality of vehicles with the current infrastructure condition of the section of roadway. In some embodiments, performing the cost-benefit analysis comprises determining whether the potential improvements result in collateral operating efficiency losses that outweigh the calculated lost operating efficiency of the plurality of vehicles. In some embodiments, performing the cost-benefit analysis comprises weighting one or more factors contributing to the lost operating efficiency in accordance with one or more priorities set forth by a municipality controlling the section of roadway.

In some embodiments, determining the current operating conditions associated with the plurality of vehicles traversing the section roadway comprises determining the current operating conditions at multiple subsections making up the section of roadway.

In some embodiments, a system comprises at least one processor, and at least one memory unit operatively connected to the processor. The at least one memory unit has stored thereon, at least one computer program comprising computer code causing the at least one processor to perform the following. Data indicative of at least one of a vehicle's current speed, acceleration, and position, along with data characterizing roadway conditions at or near the vehicle's current position can be received. Data, based upon at least one of the vehicle's current speed, acceleration, and position, indicating that the vehicle experienced a slow-down can be received. Lost operating efficiency due to the slow-down considering the roadway conditions can be calculated. The severity of the slow-down in relation to other detected slow-downs experienced at or near the vehicle's current position or other locations of roadway controlled by a municipality can be ranked. The implementation of one or more improvements to roadway infrastructure at the vehicle's current position based upon a determination that the one or more improvements are warranted based on the ranking of severity of the slow-down can be logged.

The data indicative of at least one of the vehicle's current speed, acceleration, and position is received from a roadside unit by an infrastructure analysis component operatively connected to the roadside unit. The vehicle communicates the data indicative of at least one of the vehicle's current speed, acceleration, and position to the roadside unit via a vehicle-to-infrastructure communications channel. The data characterizing the roadway conditions is received from the roadside unit by the infrastructure analysis component.

In some embodiments, calculating the lost operating efficiency comprises calculating a decrease in fuel economy due to the slow-down. In some embodiments, calculating the lost operating efficiency comprises calculating lost travel time due to the slow-down. In some embodiments, the at least one computer program further causes the at least one processor to notify the municipality of the ranking upon which a decision to proceed with the implementation of the one or more improvements to the roadway infrastructure is based.

In some embodiments, the at least one computer program further causes the at least one processor to measure a current operating efficiency associated with vehicles traversing the vehicle's current position subsequent to the implementation of the one or more improvements. The at least one computer program further causes the at least one processor to determine whether a measured effectiveness of the one or more improvements based upon the current operating efficiency meets or exceeds a municipality-determined threshold.

In some embodiments, the at least one computer program further causes the at least one processor to generate at least one additional recommendation regarding at least one additional improvement to the roadway infrastructure. This is done upon a determination that that measured effectiveness fails to meet or exceed the municipality-determined threshold.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
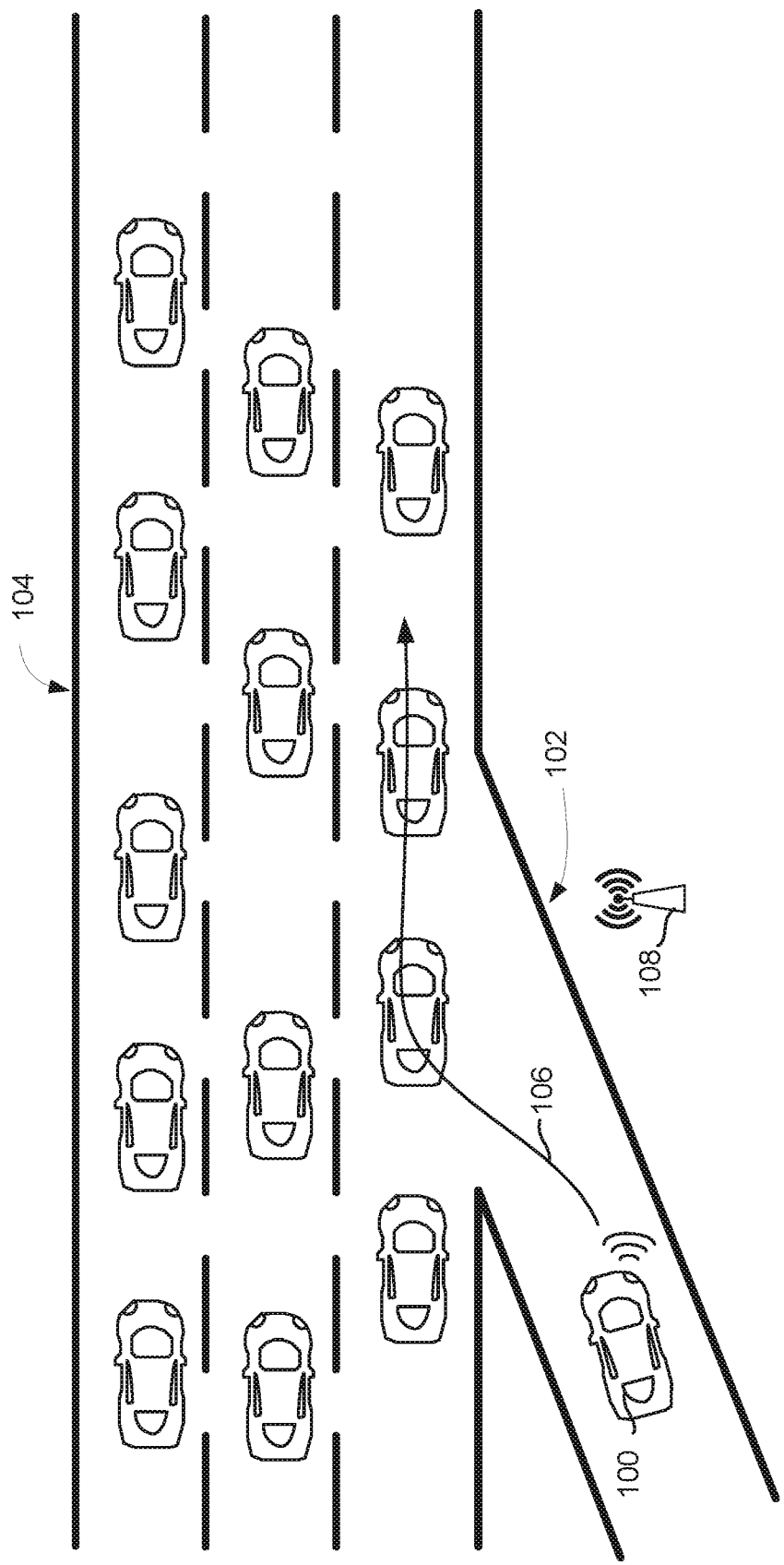
FIG. 1 is a graphical illustration of an example traffic scenario for which current roadway infrastructure may be analyzed for potential improvements.

The figures are not exhaustive and do not limit the present disclosure to the precise form disclosed.

DETAILED DESCRIPTION

Various embodiments are directed to improving roadway infrastructure based upon at least one of vehicle operating conditions and road conditions. It should be understood that roadway infrastructure can refer to a variety of different road features, including but not limited to the roads themselves, traffic signs, traffic lights, roadway configuration, toll road payment areas, and the like. It should also be understood that roadway infrastructure can refer to, but is not limited to the applicable infrastructure of any type of road, e.g., freeway, highway, residential roadway, retail parking lot/structure, frontage road, etc. Improvements to roadway infrastructure may include updating existing roadway infrastructure, such as fixing or maintaining sections of roadway vis-à-vis repaving, paving previously unpaved sections of roadway, adding lanes, reconfiguring traffic paths, and the like. Improvements to roadway infrastructure may also include reprogramming traffic light cycling to improve traffic patterns through one or more intersections. It should be understood that these roadway infrastructure improvements are merely examples, and not meant to be limiting.

The aforementioned vehicle operating conditions may be used as determining factors for implementing improvements to roadway infrastructure. That is, the impact of current roadway infrastructure on one or more vehicles traversing/using the current roadway infrastructure can be used as a gauge to determine if improvements to the current roadway infrastructure would be beneficial. Vehicle operating conditions can be determined by in/on-vehicle sensors capable of characterizing a vehicle's operation prior to, during, or subsequent to traversing the roadway infrastructure at issue.

For example, vehicle operating conditions, such as speed and acceleration may be determined by one or more vehicle sensors. This information may be relayed to roadside units of a vehicle-to-infrastructure communications system. The roadside units may, in turn, relay the vehicle operating conditions information to an infrastructure analysis component or processor, such as that operated and/or controlled by a municipality, e.g., city, state, or other entity. The infrastructure analysis component may, based on the vehicle operating conditions, determine that the roadway infrastructure has had a negative impact on the vehicle operating conditions, e.g., has caused a slow-down. The infrastructure analysis component may further determine or calculate lost vehicle operating efficiency, e.g., decrease in fuel economy, lost time, etc. If the loss in vehicle operating efficiency is great enough to warrant an improvement to the roadway infrastructure, the infrastructure analysis component may determine what those improvements might entail, and at what cost. Recommendations may then be output by the infrastructure analysis component for presentation, e.g., to the aforementioned municipality. For example, a report describing one or more options for improving roadway infrastructure may be generated and sent to an officer, administrator, or other interested personnel in the municipality. In some embodiments, the infrastructure analysis component may perform post-improvement implementation analyses to determine the effectiveness of a roadway infrastructure improvement that was implemented, and further recommendations may be generated. In some embodiments, the infrastructure analysis component may perform pre-improvement implementation analyses to determine a predicted effectiveness of a proposed roadway infrastructure improvement option.

In this way, drivers of vehicles can avoid the frustration of inefficient roadways and other infrastructure. Moreover, improvements in fuel economy (as well as maintaining desired battery state of charge (SOC)) can be provided to vehicles, individually and as a group. These advantages can lead to popularizing an area or region accessible by the improved roadways, which in turn may also lead to increased revenue for businesses in those popularized areas or regions.

Figure 2:
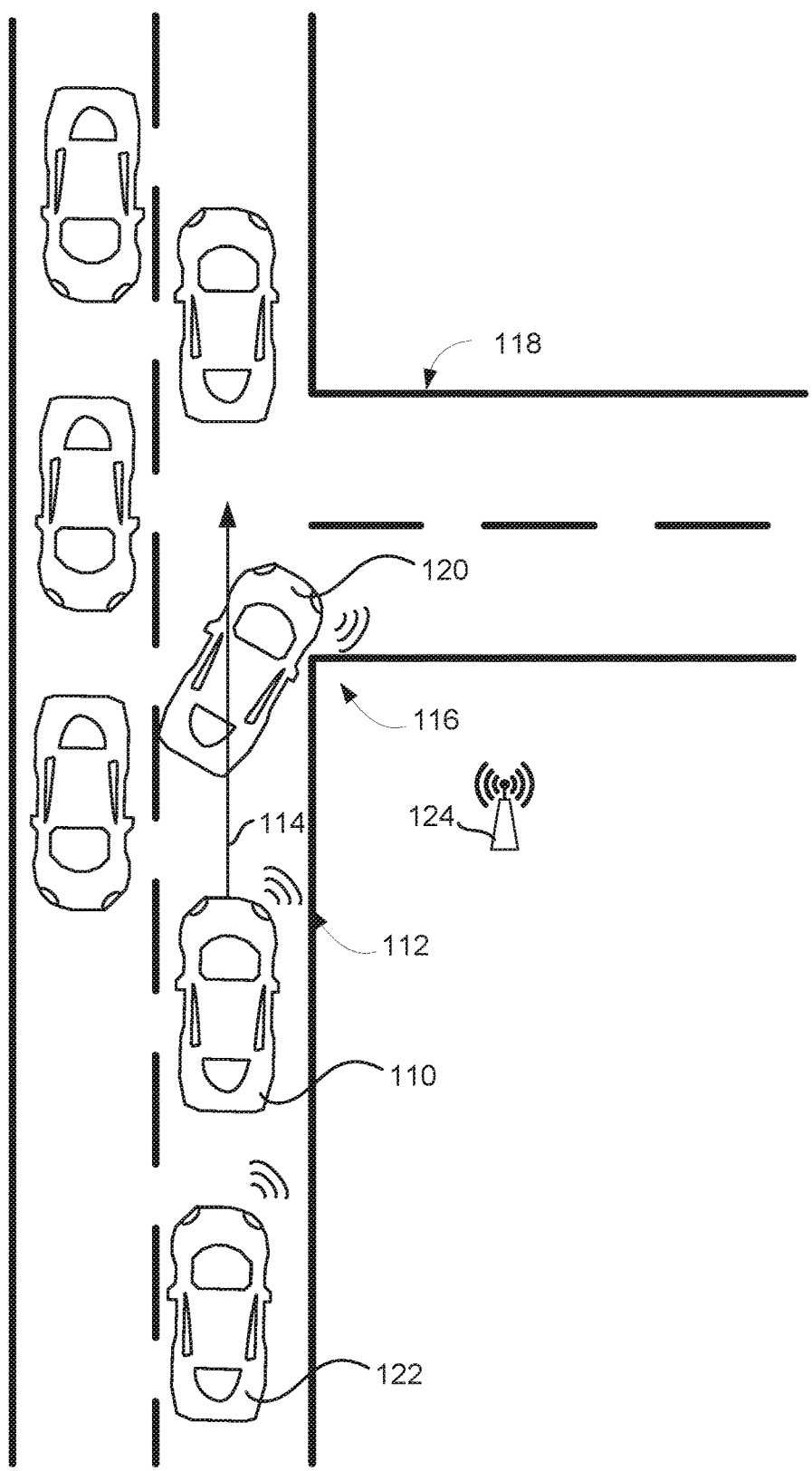
FIG. 2 is a graphical illustration of another example traffic scenario for which current roadway infrastructure may be analyzed for potential improvements.
Figure 3:
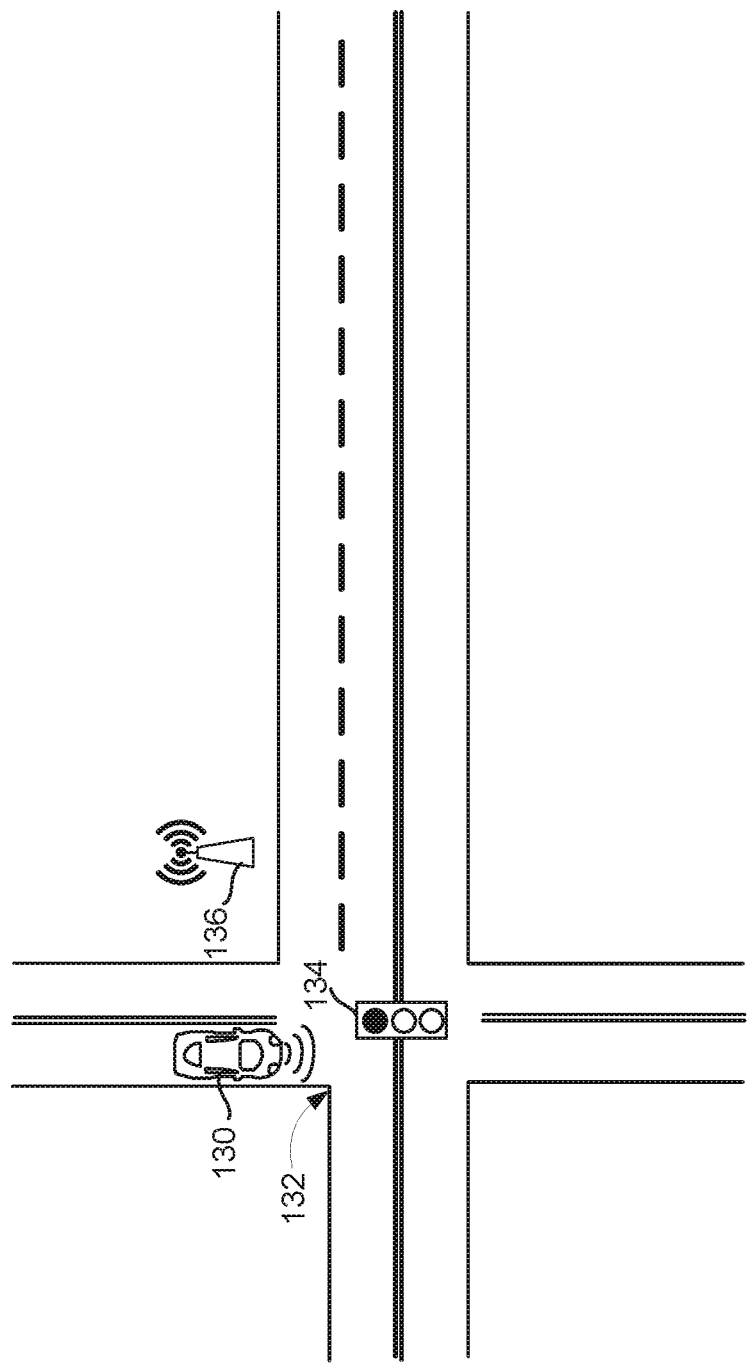
FIG. 3 is a graphical illustration of still another example traffic scenario for which current roadway infrastructure may be analyzed for potential improvements.

FIGS. 1-3 illustrate some example scenarios during which vehicle operating conditions may be obtained and used to determine whether or not improvements to roadway infrastructure may be warranted.

In particular, FIG. 1 illustrates a scenario in which a driver of vehicle 100 is traversing an entrance ramp 102 in order to access freeway 104 (see arrow 106). It can be appreciated that numerous other vehicles are traveling on freeway 104. The number of vehicles traveling on freeway 104 may create delays for the driver of vehicle 100. That is, the driver of vehicle 100 may have to wait before entering freeway 104. The more vehicles that are traveling on freeway 104, especially at or near entrance ramp 102, the longer the driver of vehicle 100 may have to wait until an opening in traffic occurs, and he/she can join the traffic flow on freeway 104.

In this scenario, it can be appreciated that the operating efficiency of vehicle 100 is being negatively impacted due to the excessive traffic on freeway 104. The driver of vehicle 100 may lose time by having to slow down and wait for an opening in traffic on freeway 104. Moreover, vehicle 100, as a result of having to slow down (and perhaps stop) before being able to progress again, may not be as fuel efficient had vehicle 100 been able to drive along entrance 102 and enter freeway 104 without slowing down. Accordingly, this scenario is one in which an improvement to roadway infrastructure may be of benefit to vehicle 100 as well as other vehicles attempting to enter freeway 104 at entrance ramp 102.

In order to determine whether or not an improvement to freeway 104 and/or entrance ramp 102 is warranted, vehicle 100 may transmit its operating conditions to roadside unit 108. Sensors such as one or more cameras, accelerometers, brake and/or acceleration pedal sensors, location sensors, e.g., GPS sensors, and the like may be used to determine the operating conditions of vehicle 100. Such operating conditions may include, but are not limited to one or more of its current speed, it's current acceleration, and/or its current position. These operating conditions of vehicle 100 may be relayed to roadside unit 108. For example, during the time in which vehicle 100 is traversing entrance ramp 102, vehicle 100 may relay its operating conditions to roadside unit 108. Alternatively, such operating conditions may be determined by one or more sensors implemented in/near traffic signals, roadside units, or implemented under the roadway (not shown). The operating conditions may characterize vehicle 100 as having slowed down, stopped, lost fuel economy, etc. from the time it began traversing entrance ramp 102 until the time vehicle 100 actually entered traffic on freeway 104. For example, vehicle 100, based on its approach speed, prior to slowing down, may have been able to enter freeway 104 within 5 seconds (without any delay due to roadway infrastructure inadequacies) as opposed to 20 seconds. Moreover, vehicle 100 may be considered to have a relative fuel economy difference/benefit from not stopping or idling for a period of time of, e.g., +3.5 mpg.

Although only a single roadside unit is illustrated, it should be appreciated with any number of roadside units may be implemented at or near one or more sections of roadway. Roadside unit 108 may be embodied as one of various types of communications nodes in a vehicular communication network, such as a V2I communications network. In some embodiments, roadside unit 108 may be configured to operate as, e.g., a dedicated short-range communications device. In some embodiments, roadside unit 108 may communicate with other roadside units, as well as with one or more other entities. Those entities may be information providers that disseminate, e.g., traffic-related information, that roadside unit 108 may forward to vehicles and/or retain as information, e.g., road conditions, to be used in various embodiments.

As will be described below, the operating conditions of vehicle 100 (and other vehicles traversing entrance ramp 102) may be analyzed to determine what improvements may be made to entrance ramp 102 and/or freeway 104 to reduce the amount and/or severity or slow-downs. Potential improvements may include, e.g., adding an additional lane to freeway 104 to alleviate traffic and reduce/eliminate slow-downs, adding a traffic light to entrance ramp 102 to better regulate entering traffic, etc. Moreover, the potential improvements can be analyzed to determine whether or not the expected improvement(s) to the current roadway infrastructure make sense from a fiscal standpoint. The potential improvements can be analyzed to determine whether or not the time lost/slow-downs resulting from implementing the improvement(s) (e.g., construction time needed to add an additional lane) would not justify the improvement.

FIG. 2 illustrates another example scenario in which a vehicle 110 is traveling on a road 112. While the driver of vehicle 110 wishes to drive straight (see arrow 114) along road 112, he/she must slow down due to preceding vehicle 120. Preceding vehicle 120 is making a right turn at intersection 116 onto road 118 from road 112. The driver of vehicle 110 must wait until preceding vehicle 120 completes its turn onto road 118 before continuing along road 112.

It can be appreciated here, that the slow-down vehicle 110 must undergo can negatively impact the operating efficiency of vehicle 110 from both a fuel economy standpoint as well as a time lost standpoint. That is, the fuel economy of vehicle 110 may be negatively impacted by having to slow down, potentially stop, and accelerate to continue along its desired path on road 112, as opposed to a scenario in which vehicle 110 could have just continued along road 112. Moreover, the driver of vehicle 110 loses time by having to wait for preceding vehicle 120. The negative impact of vehicle 120 making its turn onto road 118 is exacerbated when considering that vehicle 122, which is following vehicle 110 is also forced to slow down and wait until preceding vehicle 120 completes its turn. Any other vehicles behind vehicles 110 and 122 would also experience the same lost time and/or decrease in fuel economy due to the single event of vehicle 120 turning onto road 118.

Accordingly, the example scenario illustrated in FIG. 2 suggests the potential need for an improvement to the roadway infrastructure at or near intersection 116 between roads 112 and 118. As alluded to above, based on vehicle operating conditions characterizing the operation of one or more of vehicles 110, 120, and 122, it may be determined that the resulting slow-downs and/or time lost by these vehicles warrant some form of improvement to the roadway infrastructure. The vehicle operating conditions may be relayed from each respective vehicle to one or more roadside units, e.g., roadside unit 124. It should be noted that roadside units such as roadside unit 124 may be implemented or embodied as roadway infrastructure, including but not limited to traffic signals, traffic billboards, etc.

Potential improvements to the roadway infrastructure at or near intersection 116 may include adding a dedicated turn lane to road 112. In this way, the act of turning by preceding vehicle 120 need not slow down any following vehicles, e.g., vehicles 110 and 122. In this scenario, vehicles 110 and 122 may have theoretically been able to traverse the section of roadway near intersection 116 within 3 seconds without any delay, as opposed to 6 seconds with the delay of waiting for vehicle 120 to complete its turn. Additionally, vehicles 110 and 122 may each have a current fuel economy of approximately 30 mpg when in motion at a current speed and/or rate of acceleration (i.e., non-stop condition), or a relative fuel economy difference/benefit of +1.0 mpg when no delays occur.

It should be understood that as previously noted, an analysis of the impact on operating efficiency due to implementing one or more proposed improvements, such as adding a dedicated turn lane, can be conducted. The analysis may be predictive in some embodiments, where traffic patterns can be modeled to determine the impact of the proposed improvements. In some embodiments, the vehicle operating conditions collected by, e.g., roadside unit 124 may also be used as a basis on which feedback is provided. For example, the analysis may show that the cost of adding a dedicated turn lane, and the temporary delay(s) caused by constructing the dedicated turn lane would be worth the above-noted impact to operating efficiency of vehicles traversing intersection 116. On the other hand, the analysis may reveal that vehicles were previously avoiding intersection 116 due to the resulting slow-downs, but upon adding the dedicated turn lane, the traffic would return, negating the positive impact of the dedicated turn lane. In some embodiments, recommendations regarding proposed roadway infrastructure improvements may be made, after which a municipality may undertake implementing one or more of the proposed roadway infrastructure improvements. A post-implementation analysis may then be performed to determine the effectiveness of the roadway infrastructure improvement based on actual vehicle operating conditions as a result of experiencing the roadway infrastructure improvement.

FIG. 3 illustrates yet another example scenario where vehicle operating conditions may be used as a basis for the potential implementation of roadway infrastructure improvements. As alluded to above, roadway infrastructure improvements may encompass a wide variety of actions, ranging from the large/complex to the small/simple. In the example scenario illustrated in FIG. 3, a potential roadway infrastructure improvement may simply involve reprogramming the cycling of lights at a traffic signal. That is, vehicle 130 may be approaching or may be stopped at an intersection 132. Even though no other vehicles are present at intersection 132, traffic signal 134 presents a red light to vehicle 130. Accordingly, the driver of vehicle 130 must wait (losing time, decreasing fuel economy, etc.) until traffic signal 134 cycles to a green light before proceeding through intersection 132.

Vehicle 130's operating conditions, e.g., speed, acceleration, or lack thereof (upon stopping) may be sensed by one or more sensors of vehicle 130 and/or one or more infrastructure sensors, e.g., that of roadside unit 136. In the case of vehicle 130's operating conditions being sensed by in-vehicle sensors, the operating conditions may be relayed to roadside unit 136. It should be understood that roadside unit 136 may obtain or collect operating conditions from other vehicles that approach or stop at intersection 132 over some period of time so that a traffic pattern can be ascertained and correlated with the current roadway infrastructure. Moreover, road conditions regarding intersection 132, as well as neighboring sections of the roadway (if relevant) may be obtained, e.g., by roadside unit 136. The road conditions in this example scenario may comprise data regarding how often a single vehicle, such as vehicle 130, must stop due to traffic signal 134 when no other vehicle is present at intersection 132.

Accordingly, analysis of the vehicle operating conditions and road conditions information collected or obtained by roadside unit 136 may prompt the generation of a recommendation to reprogram traffic signal 134 to flash yellow or red during appropriate times. This may avoid slow-downs and unneeded stops experienced by vehicles traveling in the same direction as that being traveled by vehicle 130. Alternatively, it may be determined that intersection 132 has an embedded road sensor, e.g., inductive detector loop, that detects the presence of vehicles waiting at intersection 132. The failure of traffic signal 134 to turn green when a single vehicle is present at intersection 132 may prompt a recommendation to check the embedded road sensor for a possible operational failure and fix the embedded road sensor if needed.

It should be understood that the above-described scenarios are examples only, and are not meant to be limiting with respect to the types of vehicle operating/road conditions that can be used to determine proposed roadway infrastructure improvements, as well as their implementation. Moreover, the above-described scenarios are not limiting with respect to the manner in which such operating conditions are obtained, nor are they limiting with regard to the types of roadway infrastructure improvements that can be proposed and/or recommended. Those of ordinary skill in the art can envision a variety of scenarios, operating conditions, and roadway infrastructure improvements that various embodiments can be adapted to ascertain, analyze, and address.

Figure 4:
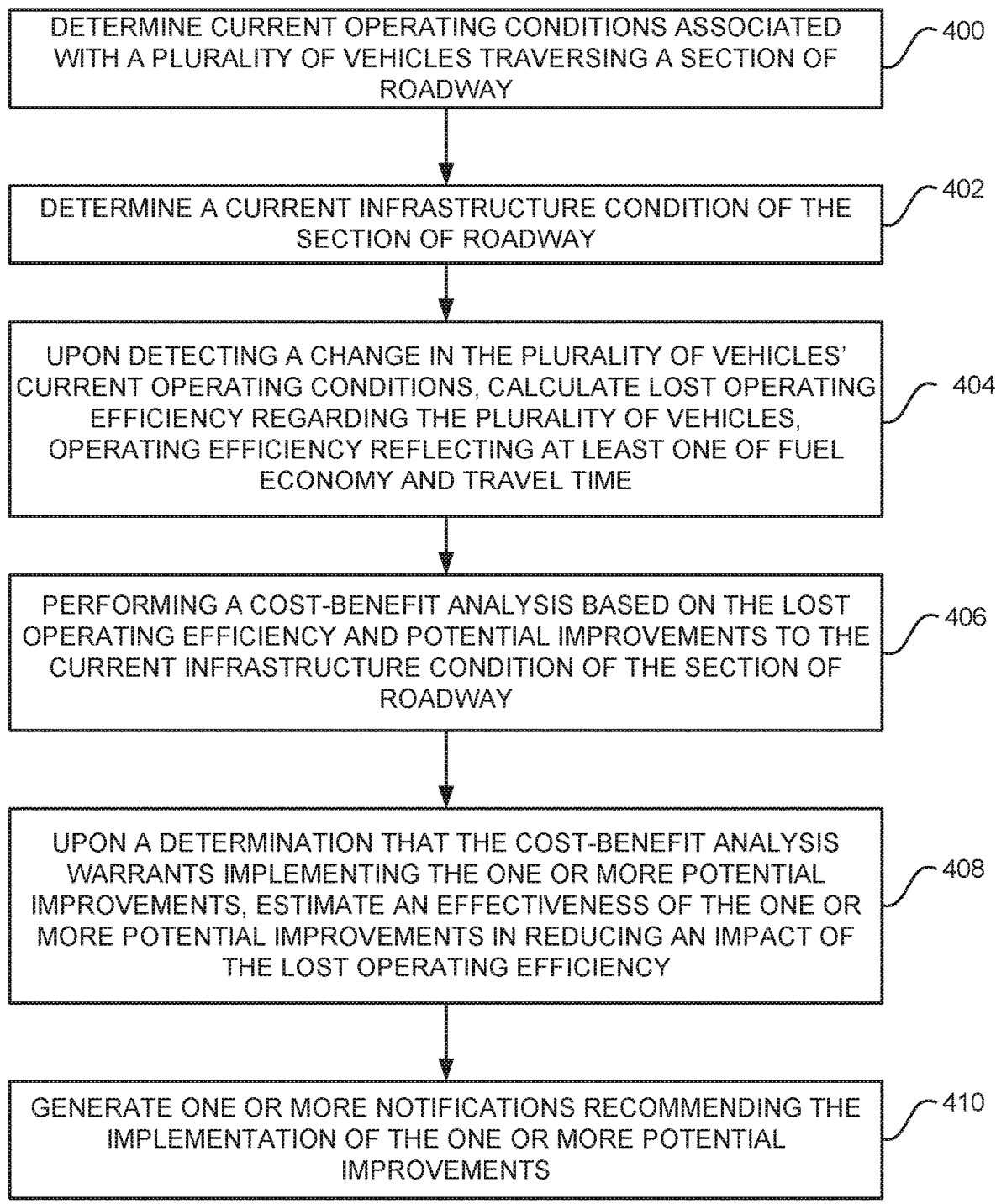
FIG. 4 is a flow chart illustrating example operations that can be performed to analyze roadway infrastructure and recommend infrastructure improvements in accordance with one embodiment.

FIG. 4 is a flow chart illustrating example operations that may be performed to determine potential roadway infrastructure improvements based on vehicle operating and/or road conditions. FIG. 4 will be described in conjunction with FIG. 5, a schematic representation of an example system architecture that may be used to recommend and/or implement roadway infrastructure improvements in accordance with various embodiments.

At operation 400, the current operating conditions associated with a plurality of vehicles traversing a section of roadway are determined. Current operating conditions associated with the plurality of vehicles may include, but are not limited to current position, speed, and acceleration. As discussed above, various embodiments contemplate determining traffic patterns associated with the current roadway infrastructure at certain sections of roadway, and the current operating conditions of vehicles are indicative of such traffic patterns. For example, the current speed of a plurality of vehicles passing an intersection or other roadway infrastructure may reflect that the plurality of vehicles consistently slow down as they approach and traverse the intersection/roadway infrastructure. As another example of an operating condition, steering actions may be sensed. That is, vehicles traversing unpaved roads or roads with excessive potholes can result in the driver of a vehicle engaging in an inordinate amount of steering or steering adjustments. Following the scenario of FIG. 2, acceleration to a certain speed/range of speeds followed by braking to a stop (to accommodate a preceding vehicle making a right turn) may be operating conditions that can be determined about the plurality of vehicles traversing a section of roadway. Further still, excessive honking by cars traversing a particular section of roadway may be an operating condition that ultimately is indicative of a need for some infrastructure improvement. The current position or location of the vehicles may be used to correlate the current vehicle operating conditions with roadway infrastructure that may be responsible for changes to current vehicle operating conditions.

Figure 5:
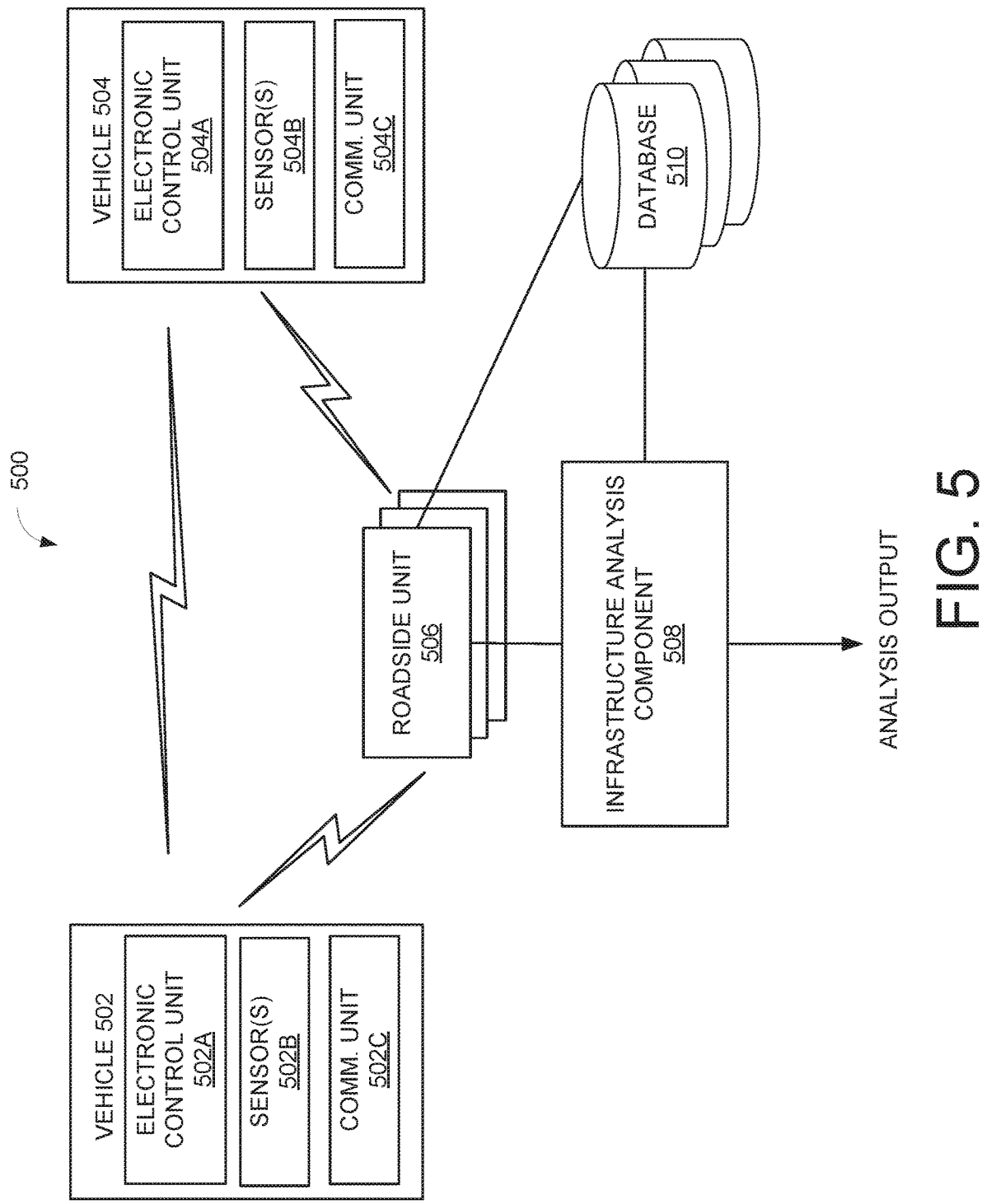
FIG. 5 is a schematic representation of an example system architecture that may be used to implement methods of infrastructure improvement in accordance with various embodiments.

Referring to FIG. 5, a system 500 for determining the feasibility and/or effectiveness of, as well as making recommendations regarding roadway infrastructure improvements based on vehicle operating/road conditions may include one or more roadside units 506. As alluded to above, roadside units may be used to collect vehicle operating conditions. As also described above, the one or more roadside units 506 may be various types of communications nodes in a vehicular communication network, such as a V2I communications network. The one or more roadside units 506 may be configured to operate as, e.g., dedicated short-range communications devices. In some embodiments, the one or more roadside units 506 may communicate with other roadside units, as well as with one or more other entities. Those entities may be information providers that disseminate, e.g., traffic-related information, that the one or more roadside units 506 may forward to vehicles and/or retain as information, e.g., road conditions, to be used in various embodiments.

System 500 may also include one or more vehicles, e.g., vehicle 502 and vehicle 504. Each of vehicles 502 and 504 may transmit their respective operating conditions to at least one of the one or more roadside units 506. In some embodiments, operating conditions of vehicles 502 and 504 may be sent to more than one element of system 500. This may be done, for example, to provide redundancy and/or to provide multiple sources of information that can be compared or used as a way to verify the validity of received information, as well as increase accuracy of the information. Moreover, the use of multiple roadside units to collect current operating conditions allows the operating conditions of a vehicle to be characterized over a greater period of time/greater distance. In this way, the current operating conditions that are collected can reflect what a vehicle is doing prior to reaching an intersection, while the vehicle is at/passes through the intersection, as well as what the vehicle is doing after traversing the intersection. As will be discussed below, changes may be detected in the current operating conditions, and detecting such changes may be made easier when analyzing a larger collection of vehicle operating conditions data (rather than that associated with a limited moment in time).

Consider, for example, that vehicle 502 is not equipped to transmit its operating conditions via V2I communications. Nevertheless, its operating conditions, such as speed, acceleration, location, etc. may still be obtained or calculated vis-à-visa data collected through roadway sensors, such as traffic signal cameras. Consider, for example, that one of one or more roadside units 506 is inoperative. Transmitting vehicle operating conditions to additional ones of the one or more roadside units 506 allows vehicle operating conditions to nevertheless be collected. Further still, vehicle operating conditions data received from a vehicle, e.g., vehicle 502 itself, such as its current speed may be compared to the current speed determined by sensors associated with at least one of the one or more roadside units 506. In this way, an average speed validated by multiple data sources can be used to characterize a vehicle, resulting in potentially more accurate determinations.

It should be further understood that each of vehicles 502 and 504 may have electronic control units (ECUs) 502A and 504A that control one or more operating aspects of their respective vehicles. For ease of explanation, it is assumed that relevant operating conditions can be determined by each vehicles' ECUs, and transmitted to one or more elements of system 500. However, operating conditions may be determined by separate sensors or systems in a vehicle and transmitted separately. It may also be assumed that each of vehicles 502 and 504 have respective data stores (not shown) for maintaining fuel economy logs, recent or historical driving characteristics/events, and the like.

Each of vehicles 502 and 504 may also have communication units 502C and 504C, respectively, e.g., wireless/radio frequency-based communications units for communicating with one or more elements of system 500 and/or each other. Vehicles 502 and 504 may communicate with each other for the purposes of sharing their respective operating conditions, which in turn may be used to verify or confirm whether or not vehicles are experiencing, e.g., slow-downs. Communications may be short-range, medium-range, and/or long-range-based communications, and may involve communications over one or more networks, such as Bluetooth, Wi-Fi, cellular, vehicular, and other networks. In some embodiments, communications between vehicles (V2V communications) or with the one or more roadside units 506, can be effectuated using, at least in part, on board units configured to communicate over dedicated short-range communications channels. An example of dedicated short-range communications channels are channels in the 5.9 GHz band allocated for use by intelligent transportation systems.

Returning to FIG. 4, at operation 402, a current infrastructure condition of the section of roadway is determined. A current infrastructure condition may be determined by the same/similar sensors used to detect vehicle operating conditions at, e.g., the one or more roadside units 506. For example, one or more cameras implemented or co-located with the one or more roadside units 506 may capture images indicative of a current lane configuration. In the case of traffic signals, for example, a particular traffic signal's cycling schedule or program may be accessed, downloaded, or otherwise determined.

It should be understood that the data indicative of vehicle operating conditions obtained at operation 400 as well as the current infrastructure condition of a relevant section of roadway obtained at operation 402 may be stored in one or more databases 510 (FIG. 5). As will be described below, this stored data may be analyzed in accordance with various embodiments. In other embodiments, however, analysis may be performed in real-time or near-real-time. Accordingly databases 510 may not be needed for storing such data. Rather, databases 510 may be used to store the results of the analyses for subsequent processing/analysis, e.g., when used as a basis for making roadway infrastructure improvement suggestions.

At operation 404, upon detecting a change in the plurality of vehicles' operating conditions, lost operating efficiency is calculated, the operating efficiency reflecting at least one of fuel economy and travel time. It should be understood that in the case of a hybrid or electric vehicle, hybrid efficiency or motor operating efficiency can be considered rather than "fuel economy." That is, the current operating conditions determined at operation 400 may reflect a change from some "steady state" of operation, e.g., a slow-down in speed, sudden deceleration, sudden acceleration, braking after traveling at some constant speed, etc. Various algorithms and/or calculations may be used to determine lost operating efficiency. In accordance with one embodiment (described in greater detail below), collected data representative of a baseline operating efficiency may be compared with current operating efficiency to determine any loss(es). For example, fuel economy for a vehicle may be estimated based upon the vehicle's speed prior to experiencing the change in operating conditions. This may be compared with estimated fuel economy taking into account the change in operating conditions. In some embodiments, comparisons may be made between vehicles experiencing the current infrastructure conditions and those not experiencing the current infrastructure conditions. For example, building on the example scenario illustrated in FIG. 2, consider a scenario where road 112 has four lanes instead of two. In such a scenario, only those vehicles in the right-most lane would experience a change in operating conditions, i.e., a slow-down, due to a preceding vehicle making a turn. Accordingly, the fuel economy and/or time of travel between two subsets of vehicles traveling a section of roadway (one experiencing a slow-down, the other not) may be compared to determine lost operating efficiency. It should be noted that collected operating conditions associated with a plurality of vehicles may vary. For example, operating conditions may comprise the fuel economy of each vehicle traversing the section of roadway, or it may comprise some calculated or estimated average fuel economy associated with the plurality of vehicles as a group.

It should be understood that the above analyses can be performed by infrastructure analysis component 508 (FIG. 5). Infrastructure analysis component 508 may perform such analyses on data reflecting current operating conditions of the plurality of vehicles traversing the section of roadway of interest. As noted above, the data may be obtained by one or more roadside units 506 (or other roadway infrastructure) and stored at one or more databases 510. Accordingly, infrastructure analysis component 508 may access the one or databases 510 to retrieve the relevant data upon which the analyses will be performed. As also noted above, in some embodiments, infrastructure analysis component 508 may communicate directly with the one or more roadside units 506 (or via a temporary cache/buffer) so that it may perform the above-described analyses in real-time or near-real-time.

At operation 406, a cost-benefit analysis based on the lost operating efficiency and potential improvements to the current infrastructure condition of the section of roadway is performed. This analysis may also be performed by infrastructure analysis component 508. Infrastructure analysis component 508 may determine whether operating efficiency recouped by implementing one or more improvements compared to improvement implementation cost results in a net gain in operating efficiency for vehicles subsequently traversing the section of roadway. It should be noted that that improvement implementation cost may refer to actual money that must be spent in order to implement an improvement. However, cost may also refer to lost time/operating efficiency as a result of implementing the improvement. For example, if an infrastructure improvement involves construction, e.g., adding lanes, adding traffic signals, re-routing current traffic patterns, etc., lost operating efficiency can result. In some cases, this loss in operating efficiency may not justify the gain after completion of the improvement, e.g., damage to neighboring roadway infrastructure due to construction, re-routing of traffic, etc.

Other considerations may be a maximum benefit by cost analyses, e.g., bang for the buck, and maximum overall benefit, e.g., maximizing fuel economy, reducing travel time as much as possible, etc. Another consideration may be the cheapest way to implement an improvement, e.g., using a limited budget/resources can be used to create additional budget/resources for other infrastructure improvements. Still other known methods of conducting a cost-benefit analysis may be used alone or in combination with each other or those described herein.

The potential roadway infrastructure improvements can be determined in accordance with various methods. For example, the one or more databases 510 may also include data stores in which default or standard improvement ideas are maintained. For example, a municipality, by analyzing previously-implemented roadway infrastructure improvements may collect data regarding roadway infrastructure conditions and preferred or possible improvements to that roadway infrastructure. This data may be correlated with previously observed losses in operating efficiency, as well as levels of improvement to operating efficiency. Accordingly, currently-observed losses in operating efficiency at a particular section of roadway, given a particular infrastructure condition can be matched with data in the one or more databases 510. Corresponding improvements can be taken and used as potential roadway infrastructure improvement suggestions. In some embodiments, current infrastructure conditions may be modeled, and simulations may be performed to identify possible improvements to the current infrastructure conditions. In some embodiments, roadway infrastructure improvement data may be continuously stored and updated so that infrastructure analysis component 508 may learn, and over time, generate better/more preferable potential roadway infrastructure improvement suggestions.

It should be noted that a municipality or other entity in control of infrastructure analysis component 508 may customize its operation in accordance with desired needs, desired priorities, etc. For example, a municipality may weigh certain operating efficiency losses differently than others. In some municipalities, more weight may be given to time lost as opposed to lost fuel economy. Accordingly, potential improvements to the current infrastructure conditions may vary. A municipality may choose to extrapolate a certain issue regarding current infrastructure conditions to estimate a cost function, or it may not. A municipality may choose to implement a potential improvement to a current infrastructure condition based upon a certain volume of drivers rather than the impact to operating efficiency for each driver. For example, reprogramming a traffic signal in accordance with a first timing cycle may provide marginal gains in travel time for 1000 drivers per day. A municipality may consider this more beneficial than reprogramming the traffic signal in accordance with a second timing cycle that provides larger gains in travel time but for only 10 drivers per day.

At operation 408, upon a determination that the cost-benefit analysis warrants implementing the one or more potential improvements, an effectiveness of the one or more potential improvements in reducing an impact of the lost operating efficiency is estimated. As noted above, infrastructure analysis component 508 may perform some form(s) of a cost-benefit analysis to determine the feasibility of implementing a proposed roadway infrastructure improvement. Additionally, one or more simulations or models may be run or used, respectively, to estimate the effectiveness of the one or more potential improvements. This can be done for redundancy purposes and/or as a confirmation step prior to actually implementing the roadway infrastructure improvement. In some embodiments, the same/similar methods and techniques used for performing the cost-benefit analysis may be applied to an extrapolated time model to estimate effectiveness.

At operation 410, one or more notifications recommending the implementation of the one or more potential improvements. That is, infrastructure analysis component 508 may select one or more potential improvements identified by its cost-benefit analysis and is estimated effectiveness analysis. Again, an entity controlling infrastructure analysis component 508, such as a municipality may customize this recommendation operation to comport with one or more preferences. For example, a municipality may wish to limit the number of roadway infrastructure improvement recommendations based upon a cost threshold, implementation timeline constraints, some minimum improvement in operating efficiency threshold, etc. Infrastructure analysis component 508 may generate its analysis output in various forms, e.g., formalized reports that include analysis results, summaries, financial impact, etc. In other embodiments infrastructure analysis component 508 may generate output in more simplified formats that include, e.g., only high-level steps for implementing roadway infrastructure improvements.

Figure 6:
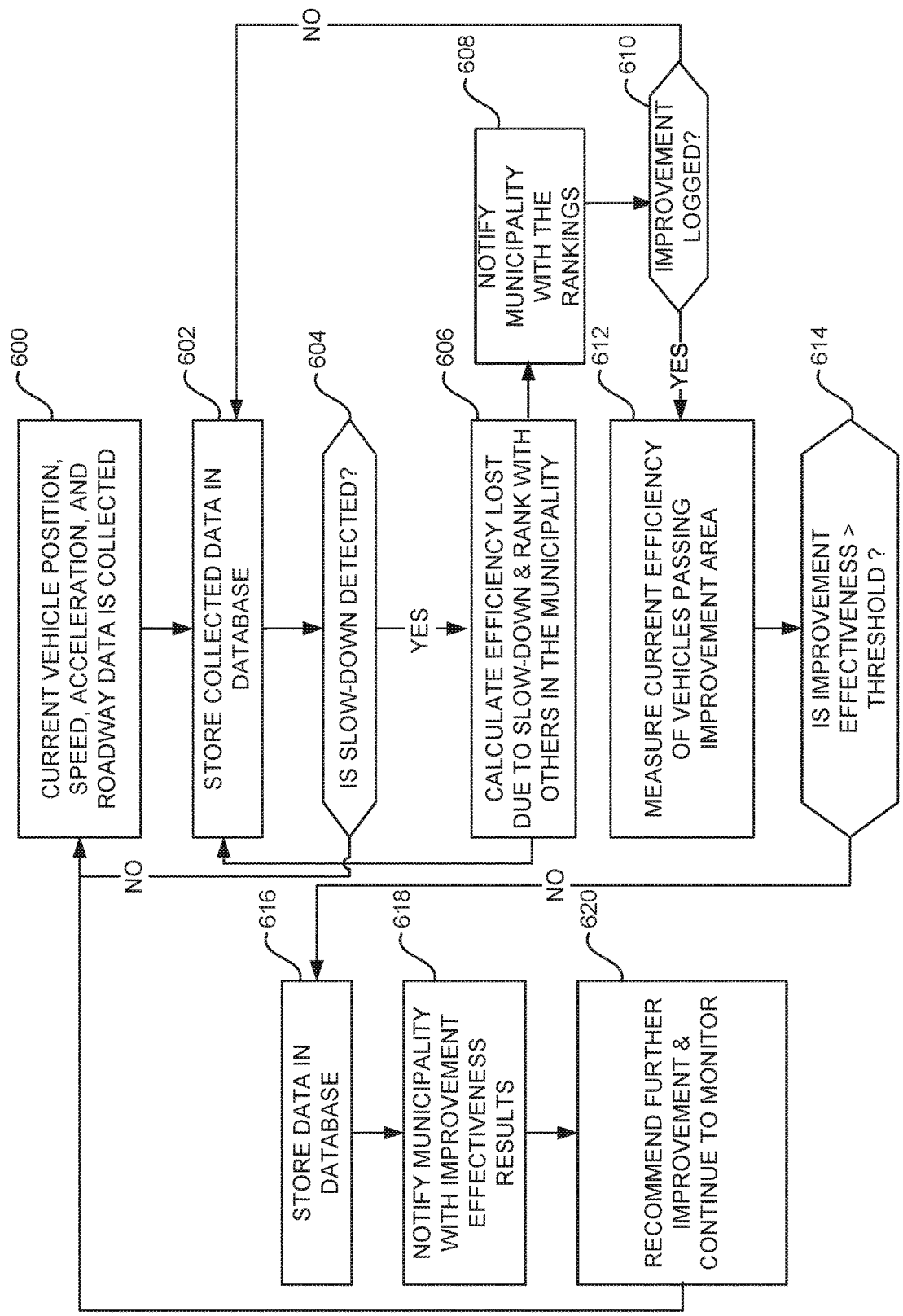
FIG. 6 is a flow chart illustrating example operations that can be performed to analyze roadway infrastructure and recommend infrastructure improvements in accordance with one embodiment.

FIG. 6 is a flow chart illustrating example operations that can be performed to analyze roadway infrastructure and recommend infrastructure improvements in accordance with another embodiment. At operation 600, current vehicle position, speed, and acceleration data is collected along with roadway data. Data collection may be initiated upon entrance into a municipality. For example, upon entering town or city limits, a prompt may be presented to a vehicle operator indicating data collection regarding operating conditions of the vehicle will be collected. The operator may choose to accept or deny this action. The prompt or notification can be presented on a vehicle head unit, via V2I communications, e.g., by a roadside unit(s) located at the town or city limits. Alternatively, the prompt or notification may be transmitted to the operator's mobile device, e.g., smart phone, via a cellular service tower located at the town or city limits from which the operator is receiving service.

The collection of vehicle operating conditions, e.g., current vehicle position, speed, and acceleration data, has been previously described, and may be accomplished by communicating in/on-vehicle sensor data to a roadside unit, for example. Roadway data, such as current traffic conditions, weather conditions having an impact on the roadway/travel along the roadway etc. may also be collected by a roadside unit, either from in/on-vehicle sensors, third-party information providers, its own sensor(s), other roadway infrastructure.

At operation 602, the collected data is stored in a database(s), e.g., one or more of the databases 510 (FIG. 5). In some embodiments, the database(s) may be cloud-based, co-located with roadway infrastructure and/or infrastructure analysis component 508. In some embodiments, the database(s) may be an in-vehicle database(s) that can be accessed, e.g., by a vehicle's ECU and upon accessing the requisite information, relay that data to an appropriate roadside unit, infrastructure analysis component, etc. In some embodiments, the database(s) may store vehicle identification information, e.g., make, model, etc. along with the collected operating conditions data and roadway data. In some embodiments, an estimated or assumed fuel economy rating or level (average and/or instantaneous) may also be stored along with the collected vehicle operating conditions data and roadway data. In some embodiments, fuel economy may be determined later as part of calculating lost operating efficiency (see operation 606). Moreover, this stored data may be linked to correlated to another database(s) or data associated with a particular area having certain roadway infrastructure or roadway infrastructure alone. The data associated with the roadway infrastructure may be data characterizing one or more aspects of the roadway infrastructure (as described above).

At operation 604, the collected information regarding the current operating conditions of the vehicle that was stored may be analyzed to determine if a slow-down occurred as the vehicle approached, traversed, and/or passed a particular section of roadway. In some embodiments, a vehicle's own ECU may be able to determine, based on its own collected information, whether or not a slow-down was experienced by the vehicle. In these embodiments, information regarding this determination may be forwarded to an infrastructure analysis component to be used as a basis for potential roadway infrastructure improvement recommendations. Slow-downs may be detected based upon data indicative of, e.g., hard braking, decrease in speed/acceleration exceeding a particular threshold, etc. If no slow-down was experienced by the vehicle, the method of operation may return to collecting operating conditions of the vehicle along with roadway information at operation 600.

Otherwise, at operation 606, the operating efficiency lost due to the slow-down is calculated, and ranked with other calculated slow-downs throughout an area such as a municipality. That is, by understanding the current operating conditions of the vehicle along with an estimated fuel economy of the vehicle, the impact of the slow-down due to current roadway infrastructure conditions may be determined (as discussed previously). In some embodiments, like the detection of a slow-down, calculation of the lost operating efficiency may be performed in/at the vehicle, wherein the calculation may be relayed to an infrastructure analysis component and/or database(s) operatively connected to the infrastructure analysis component.

Ranking of the slow-downs may be done to prioritize implementation of roadway infrastructure improvements. In some embodiments the occurrences of slow-downs within a municipality may be ranked in order to determine whether or not a potential roadway infrastructure improvement is warranted. That is, only operating efficiency losses meeting or exceeding some threshold may justify addressing the operating efficiency losses with roadway infrastructure improvements. It should be understood that the rankings need not be limited to a particular municipality, but may include other municipalities or any other relevant area being taken under consideration.

At operation 608, the relevant municipality may be notified with the rankings determined at operation 606. In this way, the municipality may determine one or more appropriate roadway infrastructure improvements it chooses to undertake in order to address the current infrastructure conditions resulting in the detected slow-downs.

At operation 610, any improvements to the roadway infrastructure may be logged. In this way, updated vehicle operating conditions and roadway data can be collected in view of any roadway infrastructure improvements. Accordingly, at operation 612, a current operating efficiency of vehicles traversing the area/roadway infrastructure that has undergone improvement may be measured. The municipality may analyze how effective an implemented roadway infrastructure improvement has been. For example, based on current vehicle position, speed, and acceleration along with roadway data, a determination can be made that slow-downs have ceased or have reduced in number compared to the previously determined occurrences. In some embodiments, some threshold level of effectiveness may be established with which to compare to the current operating efficiency of vehicles. For example, a threshold level of effectiveness may some percentage reduction in the number of slow-downs, some threshold speed at which slow-downs cannot fall below, etc. If the roadway infrastructure improvement is sufficient, the process may end.

Otherwise, at operation 616, additional data regarding the effectiveness of the improvement may be recorded. In some embodiments, this effectiveness data may be stored along with the vehicle operating conditions and roadway data, or it may be stored separately. In some embodiments, although this data may be stored separately, it may nevertheless be related to or correlated with current vehicle operating conditions and roadway data.

At operation 618, the municipality may be notified with the improvement effectiveness results. This notification may come in various forms. For example, the municipality may be provided with a comprehensive report indicating some/all of the relevant information and data regarding the roadway infrastructure improvement and its effectiveness. On the other hand, the municipality may simply be provided with a more simplified notification, such as an indication or other communication indicating the failure of a roadway infrastructure improvement to meet the effectiveness threshold.

At operation 620, further roadway infrastructure improvements may be recommended to the municipality (as previously described). Moreover, continued monitoring of the effectiveness of the roadway infrastructure improvement may occur. In some instances, the effectiveness of a roadway infrastructure improvement may not be fully realized until a certain period of time has elapsed. For example, as previously discussed, implementation of roadway infrastructure improvements can inject additional operating inefficiencies, result in collateral operating inefficiencies, etc. Again, any effectiveness data may be collected and stored as previously discussed.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Although various embodiments described herein are described in the context of improving or promoting fuel economy and/or avoiding lost time, various embodiments may be adapted to promote safe driving. For example, roadway infrastructure improvements may be proposed based upon one or more vehicle operating conditions suggestive of unsafe driving conditions. In some embodiments, the same indicators or factors may be considered, e.g., hard braking, severe deceleration/acceleration periods, excessive steering, etc. For example, hard braking may suggest a current roadway infrastructure configuration that does not allow a driver of a vehicle sufficient reaction time to react to an upcoming road feature or traffic occurrence.

Moreover, various embodiments may be utilized to log feedback and monitor the performance of crews/contractors/etc. that are completing the roadway infrastructure improvements. For example, logging effectiveness of and continuing to monitor operating efficiency associated with a particular roadway infrastructure improvement may reveal that two or more different construction teams performed similar improvements. However, it may be determined that the improvements implemented by one construction team lasted longer than that implemented by the other construction team. This information can be considered for staffing future roadway infrastructure improvement projects, strategizing regarding the resources/materials used to implement roadway infrastructure improvements, etc.

Figure 7:
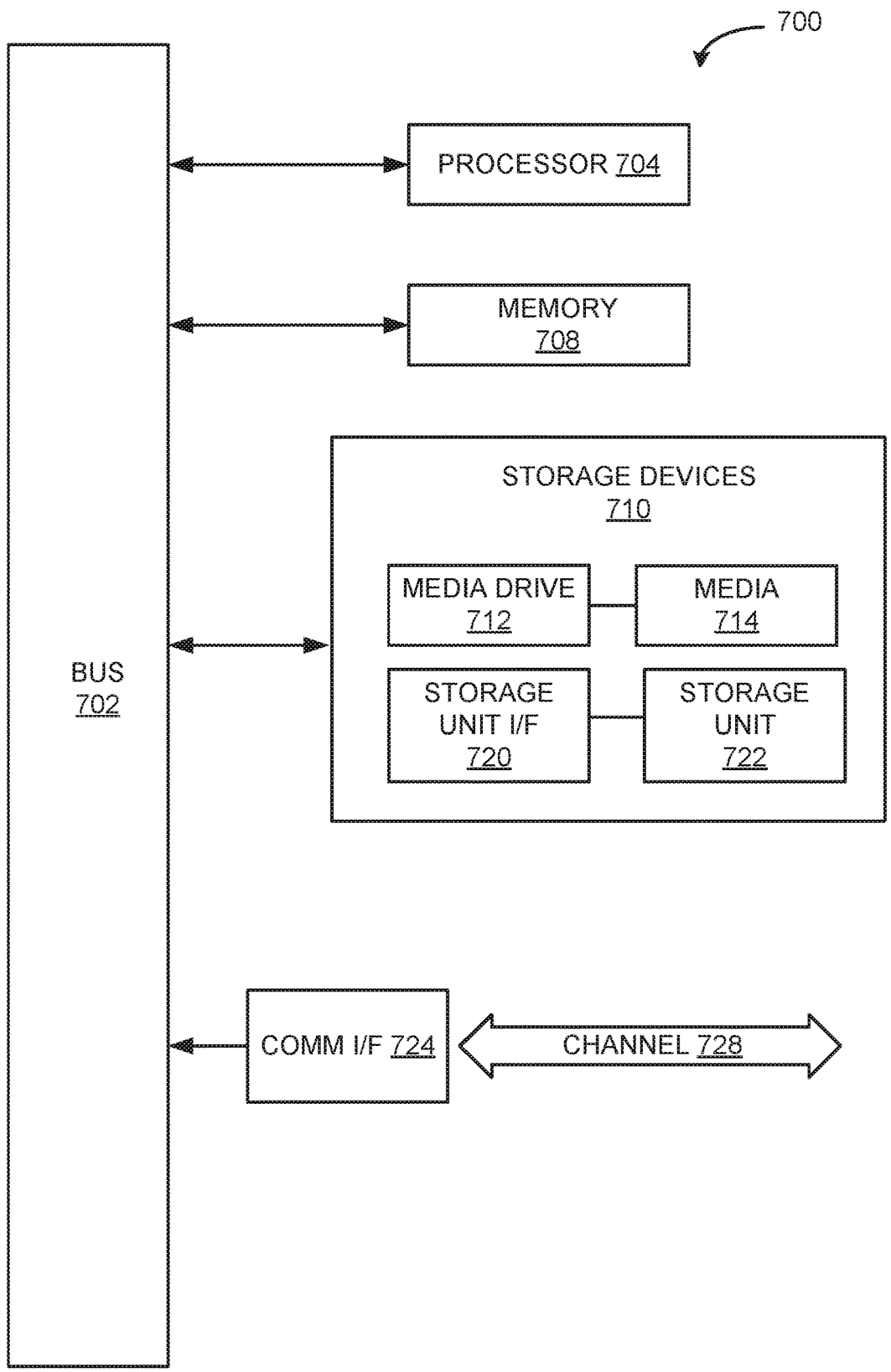
FIG. 7 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up system 500 and its component parts, infrastructure analysis component 508, ECUs 502A and 504A of vehicles 502 and 504, respectively, etc. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
upon entry into a municipality, collecting and processing, in real-time at multiple roadside units, current operating conditions being experienced by a plurality of vehicles, from respective electronic control units of the plurality of vehicles, traversing a section of roadway;
collecting, and storing in a database, information regarding current infrastructure condition of the section of roadway from the multiple roadside units simultaneously with the collecting of the current operating conditions being experienced by the plurality of vehicles traversing the section of roadway;
upon detecting a change in the plurality of vehicles' current operating conditions, calculating lost operating efficiency regarding the plurality of vehicles, wherein operating efficiency reflects at least one of fuel economy and travel time;

performing a cost-benefit analysis based upon the lost operating efficiency and potential improvements to the current infrastructure condition of the section of roadway;

upon a determination that the cost-benefit analysis warrants implementing the one or more potential improvements, validating the determination that the implementing of the one or more potential improvements based on the cost-benefit analysis is warranted by estimating an effectiveness of the one or more potential improvements in reducing an impact of the lost operating efficiency;

generating one or more notifications recommending the implementation of the one or more potential improvements, the recommended implementation of the one or more potential improvements being ranked in accordance with ranking of degree of the lost operating efficiency; and presenting the one or more notifications to the municipality for consideration regarding the implementation of the one or more potential improvements by the municipality.

2. The computer-implemented method of claim 1, wherein the current infrastructure conditions comprises at least one of a current roadway configuration, and a current roadway traffic management configuration.

3. The computer-implemented method of claim 1, wherein determining the current operating conditions comprises at least one of receiving sensor data indicative of, and calculating based on the sensor data, at least one of a current speed, instantaneous acceleration, and current location associated with each of the plurality of vehicles.

4. The computer-implemented method of claim 3, wherein detecting the change in the plurality of vehicles' current operating conditions comprises determining whether one or more of the plurality of vehicles experienced a slow-down while traversing the section of roadway.

5. The computer-implemented method of claim 4, wherein determining whether the one or more of plurality of vehicles experienced a slow-down comprises detecting at least one of a slow-down from the current speed, a decrease in the instantaneous acceleration followed by an increase in the instantaneous acceleration.

6. The computer-implemented method of claim 3, further comprising correlating the current location associated with each of the plurality of vehicles with the current infrastructure condition of the section of roadway.

7. The computer-implemented method of claim 1, where performing the cost-benefit analysis comprises determining whether the potential improvements result in collateral operating efficiency losses that outweigh the calculated lost operating efficiency of the plurality of vehicles.

8. The computer-implemented method of claim 1, wherein performing the cost-benefit analysis comprises weighting one or more factors contributing to the lost operating efficiency in accordance with one or more priorities set forth by a municipality controlling the section of roadway.

9. The computer-implemented method of claim 1, wherein determining the current operating conditions associated with the plurality of vehicles traversing the section roadway comprises determining the current operating conditions at multiple subsections making up the section of roadway.

\* \* \* \* \*